Figure 5:
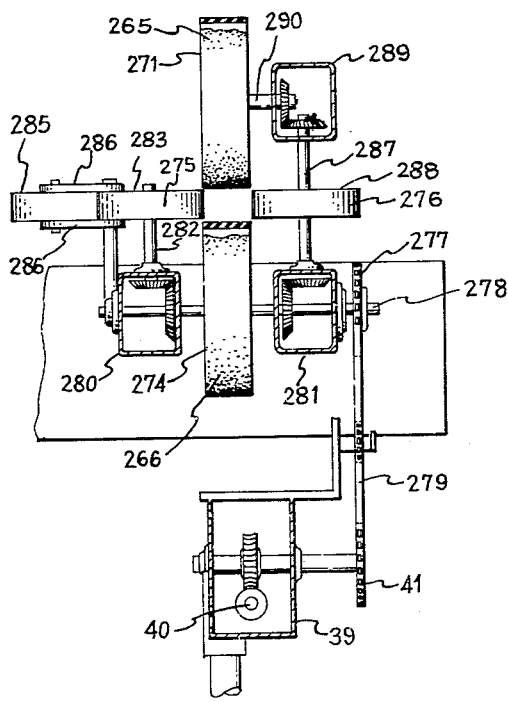

Sept. 22, 1964  C. R. HOOD  3,149,446
MACHINE AND METHOD FOR WRAPPING ARTICLES
Filed July 26, 1961  7 Sheets-Sheet 1
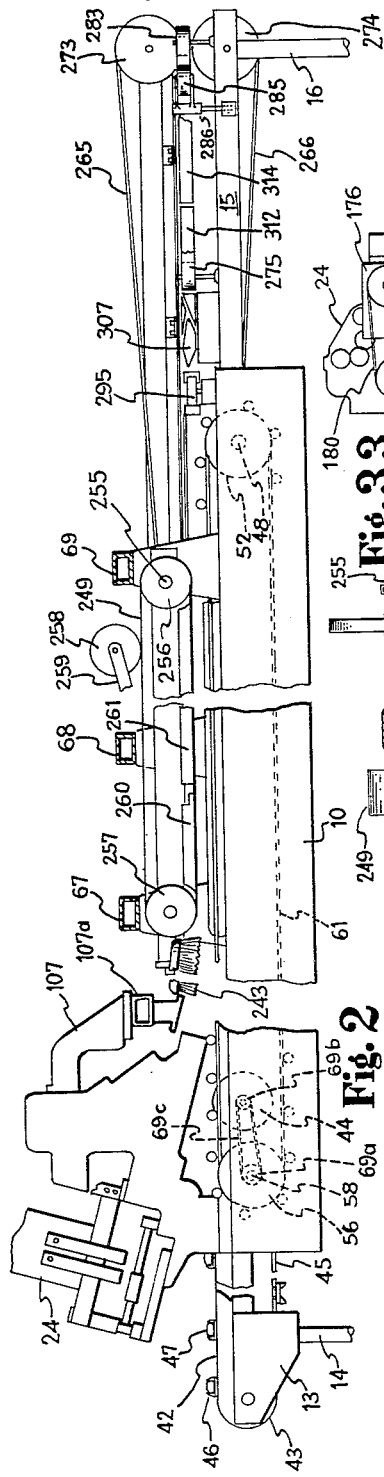
INVENTOR.
CHARLES R. HOOD,
BY
Fredrick H. Braun
ATTORNEY Sept. 22, 1964
C. R. HOOD
3,149,446
MACHINE AND METHOD FOR WRAPPING ARTICLES
Filed July 26, 1961
7 Sheets-Sheet 3
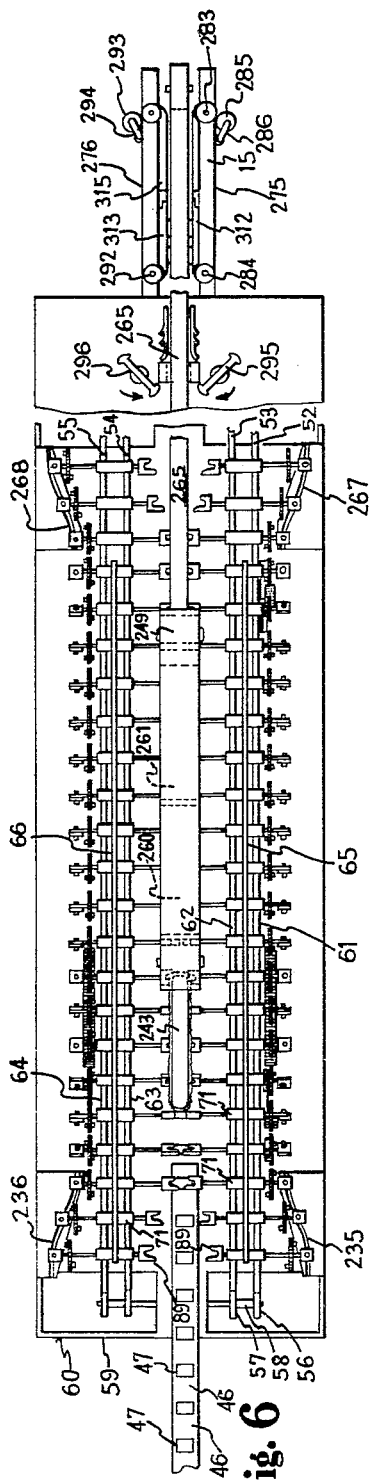
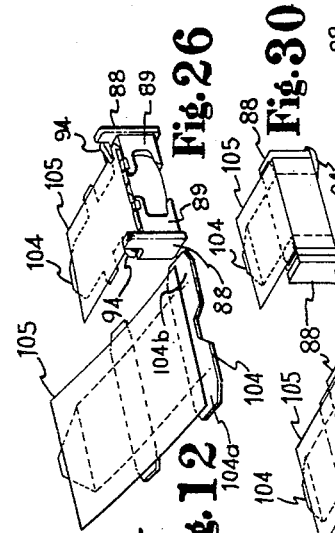
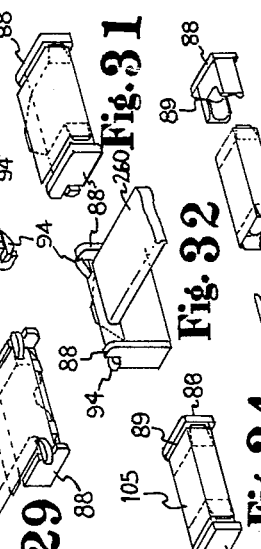
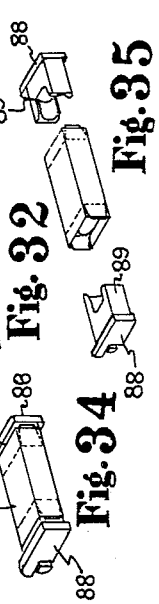
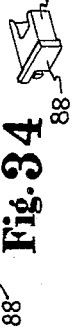
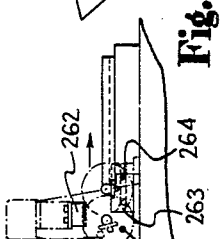
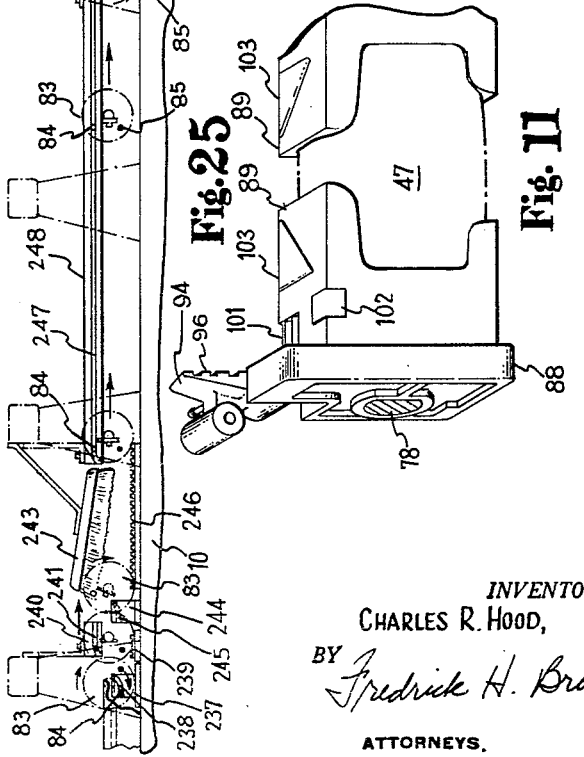
INVENTOR.
CHARLES R. HOOD,
BY Frederick H. Braun
ATTORNEYS.

Sept. 22, 1964          C. R. HOOD          3,149,446
MACHINE AND METHOD FOR WRAPPING ARTICLES
Filed July 26, 1961          7 Sheets-Sheet 4
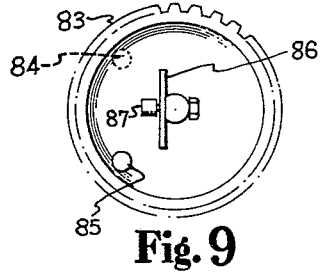
Fig. 8
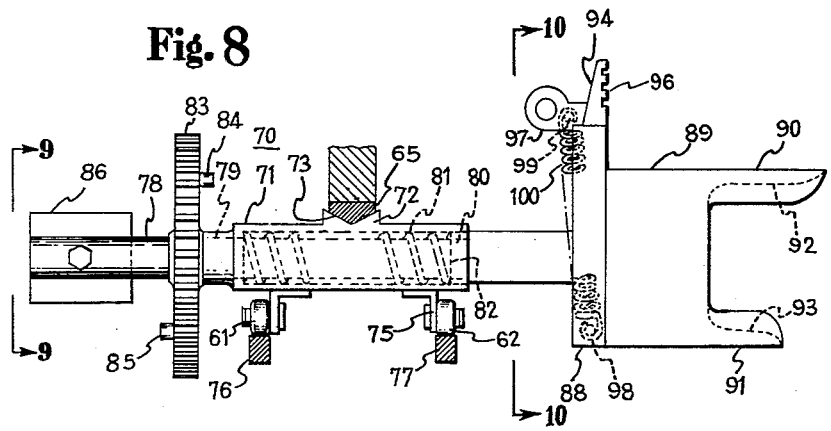
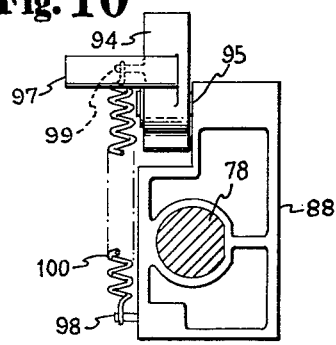
Fig. 10
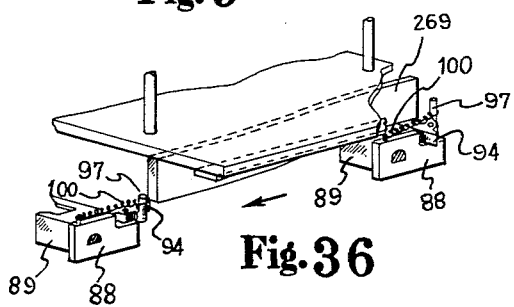
Fig. 9
Fig. 36
*INVENTOR.*
CHARLES R. HOOD,
BY *Fredrick H. Braun*
ATTORNEYS.

Sept. 22, 1964  C. R. HOOD  3,149,446
MACHINE AND METHOD FOR WRAPPING ARTICLES
Filed July 26, 1961  7 Sheets-Sheet 5

INVENTOR.
Charles R. Hood,
BY Fredrick H. Braun
ATTORNEYS.

Sept. 22, 1964            C. R. HOOD            3,149,446
MACHINE AND METHOD FOR WRAPPING ARTICLES
Filed July 26, 1961            7 Sheets-Sheet 6
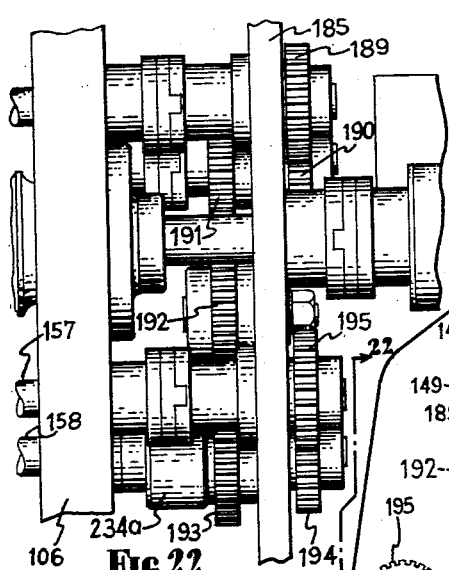
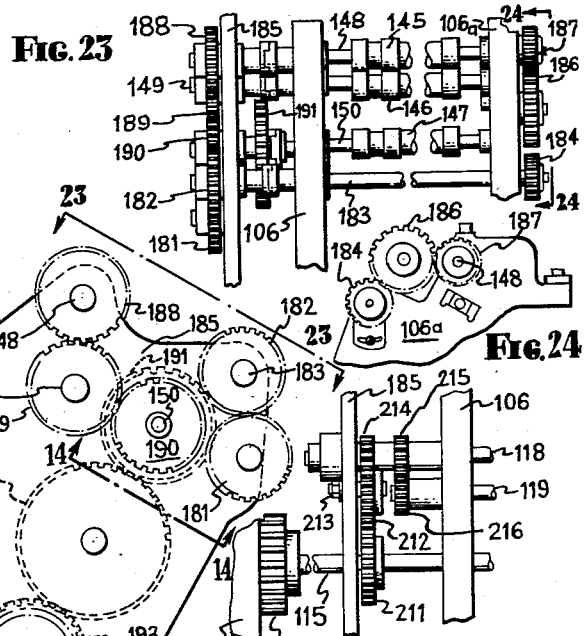
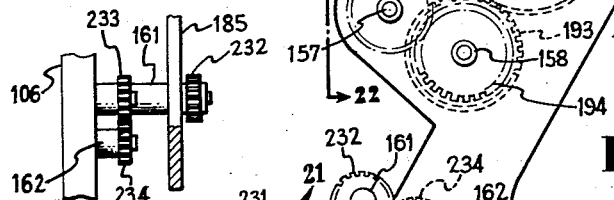
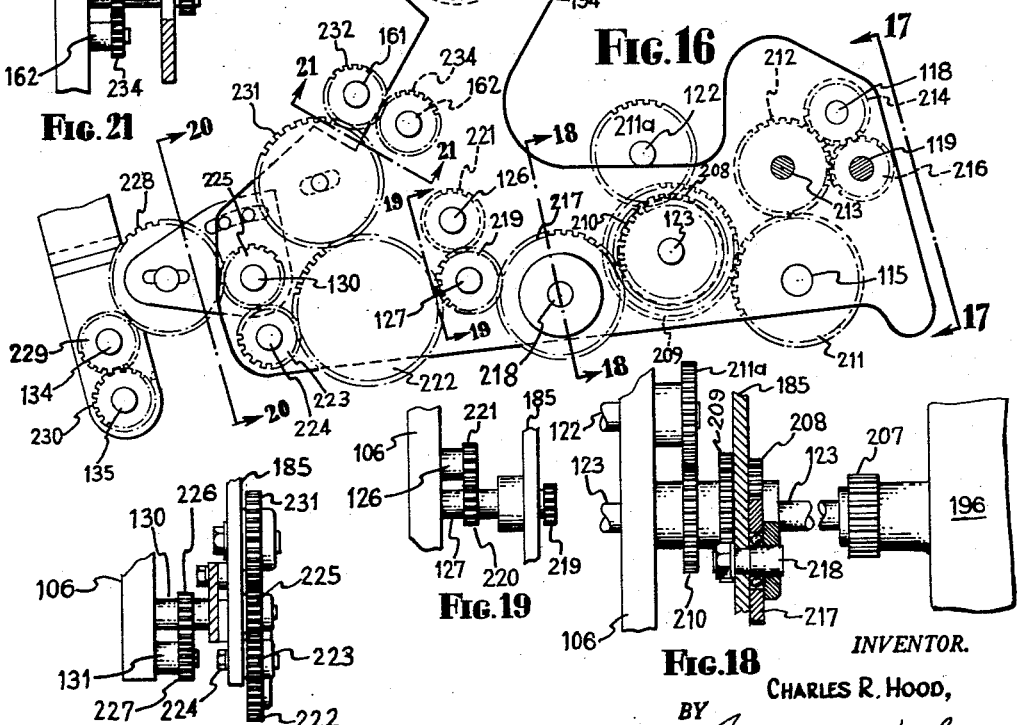
INVENTOR.
CHARLES R. HOOD,
BY Fredrick H. Brain
ATTORNEYS.

Sept. 22, 1964     C. R. HOOD     3,149,446
MACHINE AND METHOD FOR WRAPPING ARTICLES
Filed July 26, 1961               7 Sheets-Sheet 7
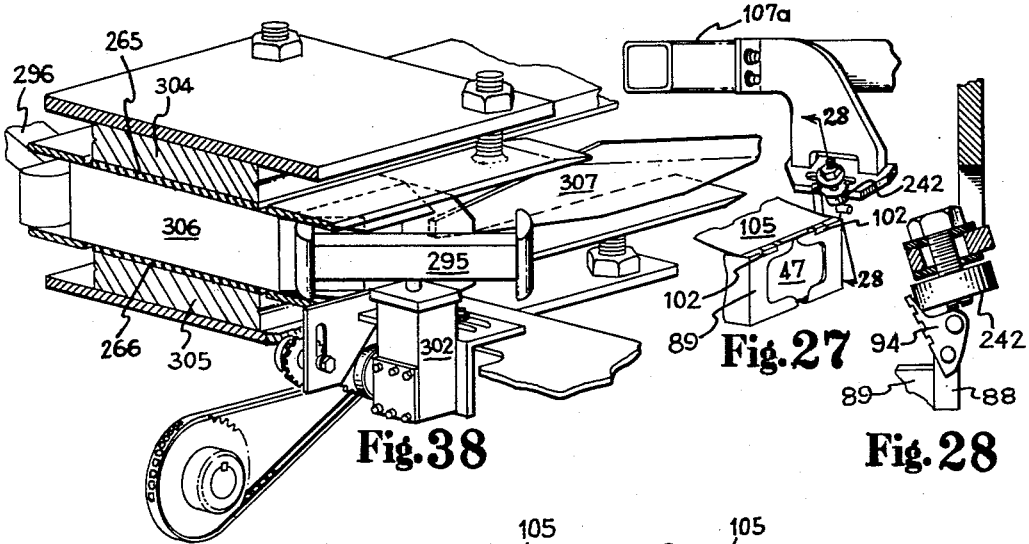
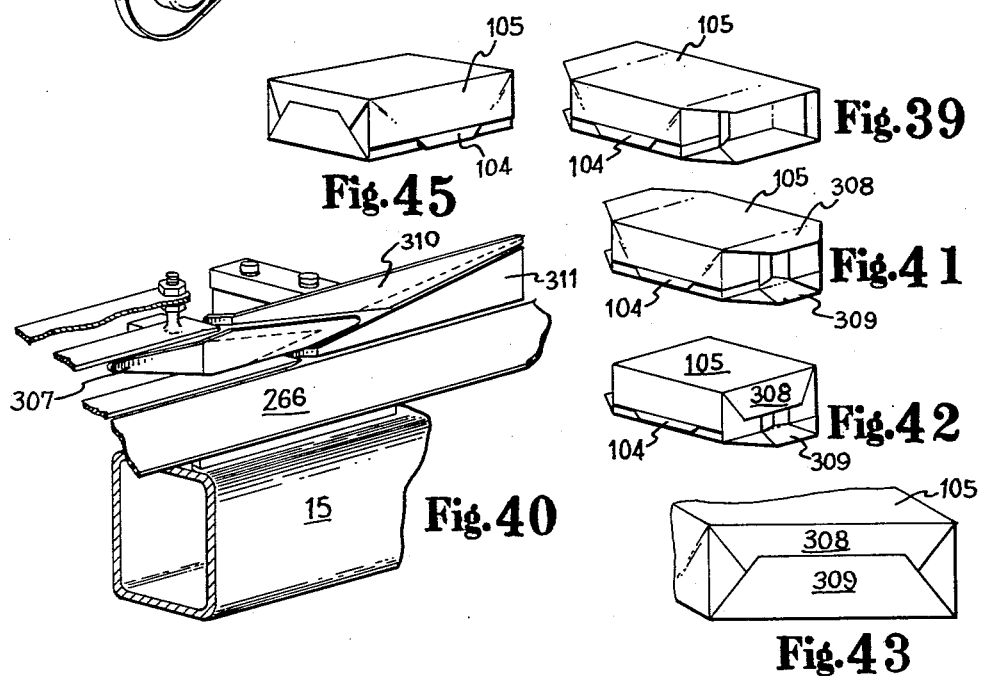
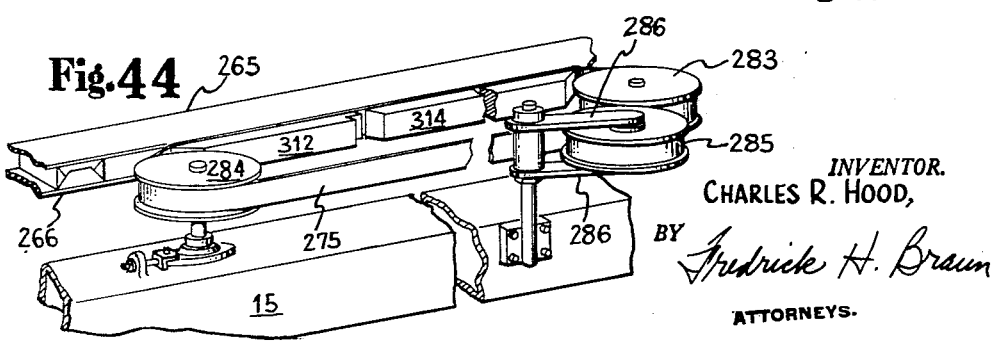
INVENTOR.
CHARLES R. HOOD,
BY Fredrick H. Braun
ATTORNEYS.

United States Patent Office 3,149,446
Patented Sept. 22, 1964

3,149,446
MACHINE AND METHOD FOR WRAPPING
ARTICLES
Charles R. Hood, Springfield Township, Hamilton
County, Ohio, assignor to The Procter & Gamble Company, Cincinnati, Ohio, a corporation of Ohio
Filed July 26, 1961, Ser. No. 126,998
28 Claims. (Cl. 53—170)

This invention relates to an apparatus and method for packaging articles, and more particularly to a machine and method for forming a package around an article by simultaneously wrapping a liner and an outer wrapper over a pair of package forming mandrels which hold the article in proper position, then sealing the overlapping portions of the outer wrapper and then forming the end tucks, folds and seals.

In general, the invention has as its object the packaging of solid articles such as bars of soap and detergent, pouches of granular material and the like. It can be used in forming a package around any kind of solid article even though the article is not rigid as, for example, a flexible and deformable pouch containing a powdery substance, e.g. cake mix. For convenience, the invention will be described in connection with the wrapping of bars of detergent since it has been successfully developed and practiced for this purpose. It will be understood, of course, that any other solid article, whether or not rigid, can be packaged by the machine and method of this invention. In other words, the particular article which is packaged by the machine and method is not to be construed as placing a limitation on the scope of the invention.

An object of the invention is the provision of an apparatus of such configuration, design and construction that a bar of detergent can be wrapped while being moved along at a substantially constant linear velocity with minimum directional transfer of the bar and wrapping material during the wrapping cycle. This results in maximum operating efficiency, a relatively simple design for a machine of this character and produces a wrapping speed in the range of about 300 bars per minute or more which is almost double the capacity of known present day wrapping machines.

Another object of the invention resides in the use of a pair of cooperating members or mandrels which support the bar of detergent at its ends so that the body of the package is formed on the mandrels and around the bar. The bar, however, does not necessarily support the package surfaces while they are being formed. This reduces damage and marking of the bar of detergent since its does not support or control folding of the package material. It also produces substantially uniform packages both as to size and quality.

A further object of the invention is the provision of a machine and method of this character which is unaffected by variations in detergent bar dimensions or in the wrapping material itself. This permits much greater flexibility in the style of package that can be produced, the shape of the bars that can be packaged and simplifies changeover from one size to another.

A further object of the invention resides in the provision of an apparatus and method for wrapping bars of detergent including means for picking up the bars without otherwise moving the bars and without changing their velocity. This further reduces product damage and marking.

Still a further object of the invention is a provision of a machine and method which can produce packages of uniform shape and size irrespective of the article being wrapped insofar as its shape or character is concerned.

Summarizing one aspect of the invention briefly, a machine is provided which is composed of an infeed conveyor section, a wrapper feed section, a wrapping section, a side sealing section and an end tucking, folding and sealing section. The individual bars of detergent are fed to the machine in spaced single file order by the infeed conveyor section. As the bars approach the wrapping section, each one is picked up by a pair of opposed mandrels which are moving at substantially the same speed as the bars. The mandrels are moved inwardly while in motion and engage and support each bar to remove it from the infeed conveyor section. A composite wrapper having inner and outer parts is fed from the wrapper feed section to each mandrel pair. As the wrapper is fed to the mandrel pair, it is clamped to one surface of the mandrel pair by appropriate means associated with each mandrel to hold the wrapper in place. The mandrels are then moved through the wrapping section with their axes in constant linear motion while simultaneously being rotated on their axes as they pass under a folding means. This causes the wrapper to be folded snugly around the inner ends of the mandrel pair. The bar of detergent is encircled on four sides by this action and the ends of the outer wrapper part are overlapped.

As the partially formed package body moves along, it enters the side sealing section where the overlapped portions of the wrapper are permanently sealed. The mandrels are then withdrawn from the partially formed package and the package is securely held and carried forward by a pair of resilient opposed belts to the end tucking, folding and sealing section of the machine. As it is moved through this section, the end tucks are formed by a rotating tucker and a stationary tucker whereupon the end folds are made by a pair of stationary plows. The package is completed as it moves past a sealing station which makes the end seals on the overlapped portions of the end folds.

Figure 15:
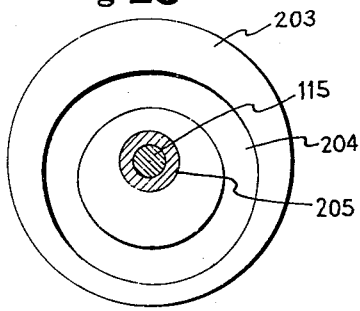
Figure 14:
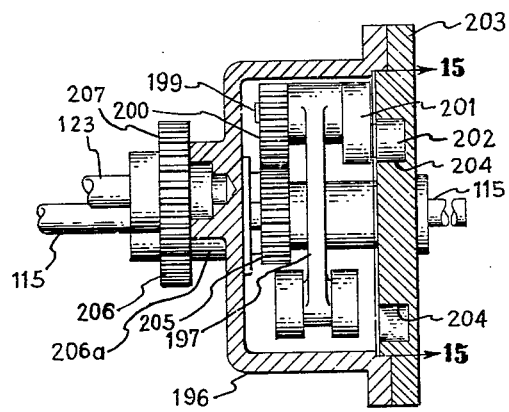
Figure 13:
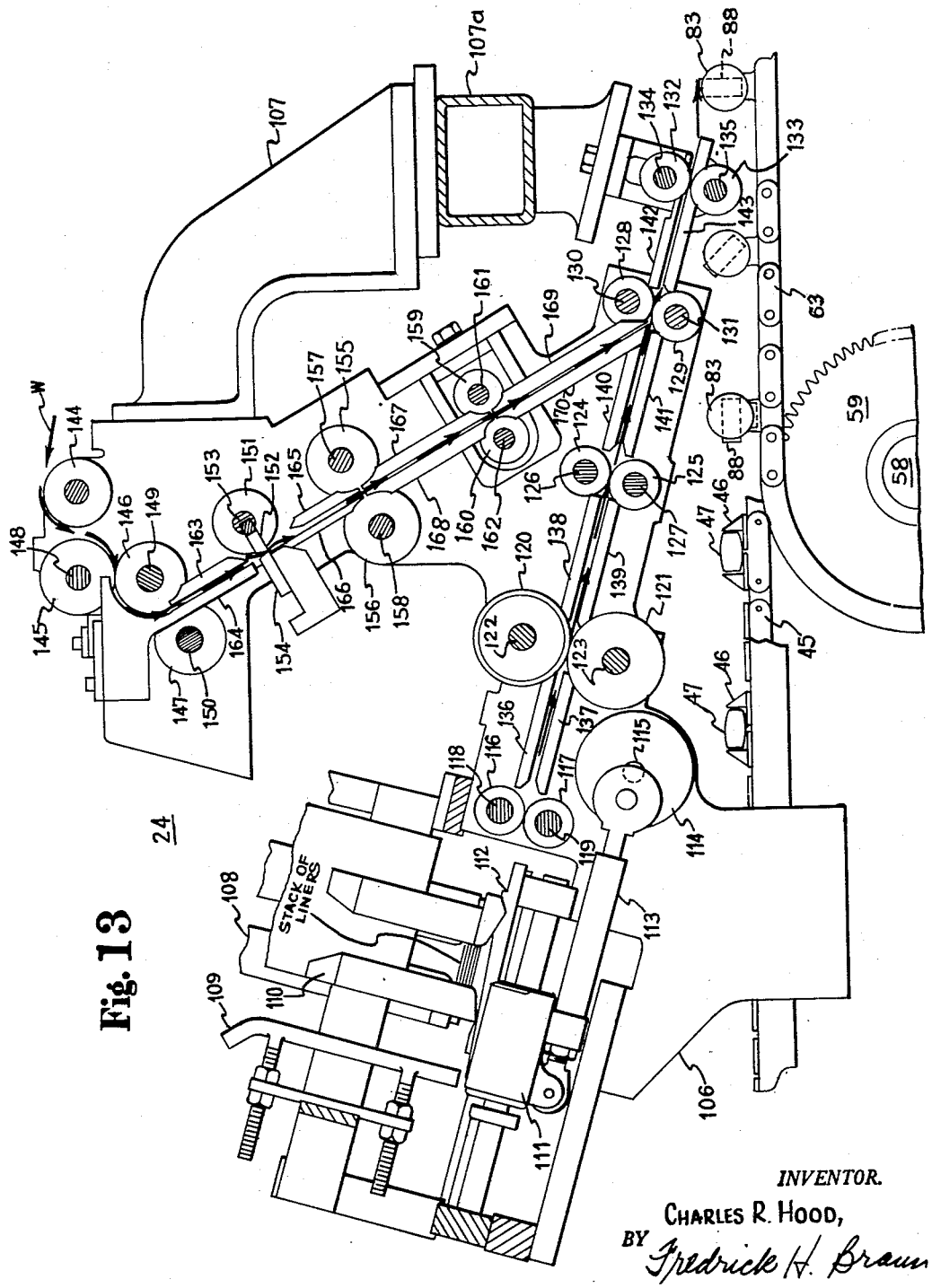

While the specification concludes with claims particularly pointing out and distinctly claiming the subject matter regarded as forming the present invention, it is believed the invention will be better understood from the following description taken in connection with the accompanying drawings in which:

FIGURE 1 is a fragmentary elevation of the wrapping machine taken from the "drive" side; and FIGURE 2 is a fragmentary elevation, with some parts in cross section, taken from the other side of the wrapping machine of FIGURE 1, this side being called the "operator" side; and FIGURE 3 is a fragmentary cross section taken along the line 3—3 of FIGURE 1; and FIGURE 4 is a fragmentary cross section taken along the line 4—4 of FIGURE 1; and FIGURE 5 is an elevation partially in cross section as seen from the line 5—5 of FIGURE 1; and FIGURE 6 is a plan view of the machine with some elements removed to expose the operative components; and FIGURE 7 is a fragmentary view partly in elevations and partly in cross section taken along the line 7—7 of FIGURE 1; and FIGURE 8 is an elevation showing the details of one mandrel member and the means for supporting same; and FIGURE 9 is an end view of the mandrel member taken on the line 9—9 of FIGURE 8; and FIGURE 10 is a cross section showing the mechanism for operating the nipper member taken along the line 10—10 of FIGURE 8; and FIGURE 11 is an isometric view of a pair of mandrel members supporting a bar of detergent prior to receiving the superposed wrapper and liner; and FIGURE 12 is an isometric view of a superposed liner and wrapper; and FIGURE 13 is a fragmentary elevation, partly in cross section, taken through the liner and wrapper feed rollers, and FIGURE 14 is a fragmentary view, partly in cross section, showing the details of the differential drive mechanism for driving the variable speed feed rollers; and FIGURE 15 is a section taken on the line 15—15 of FIGURE 14 showing the cam which controls the output speed of the differential drive; and FIGURE 16 is a fragmentary elevation showing one view of a portion of the gear train for driving the several feed rollers; and FIGURE 17 is a fragmentary view taken on the line 17—17 of FIGURE 16; and FIGURE 18 is a fragmentary view, partially in cross section, taken on the line 18—18 of FIGURE 16; and FIGURE 19 is a fragmentary view, partially in cross section, taken on the line 19—19 of FIGURE 16; and FIGURE 20 is a fragmentary view, partially in cross section, taken on the line 20—20 of FIGURE 16; and FIGURE 21 is a fragmentary view, partially in cross section, taken on the line 21—21 of FIGURE 16; and FIGURE 22 is a fragmentary view taken on the line 22—22 of FIGURE 16; and FIGURE 23 is a fragmentary view taken on the line 23—23 of FIGURE 16; and FIGURE 24 is a fragmentary view taken on the line 24—24 of FIGURE 23; and FIGURE 25 is a fragmentary schematic elevation showing the cams and racks for turning the mandrel members as they pass through the wrapping machine; and FIGURE 26 is an isometric view showing a superposed liner and wrapper attached to a mandrel pair; and FIGURE 27 is a fragmentary isometric view, partially in cross section, showing the cam for actuating the nipper members; and FIGURE 28 is a fragmentary elevation, partially in cross section taken on the lines 28—28 of FIGURE 27; and FIGURE 29 is an isometric view showing the liner and wrapper after the mandrel pair has turned them 90°; and FIGURE 30 is an isometric view showing the liner and wrapper after the mandrel pair has turned them 180°; and FIGURE 31 is an isometric view showing the liner and wrapper after the mandrel pair has turned them 270°; and FIGURE 32 is an isometric view showing the formed body of the package as it begins to pass under the sealing element; and FIGURE 33 is a fragmentary elevation view, partially in cross section, taken on the line 33—33 of FIGURE 1; and FIGURE 34 is an isometric view of a partially completed package formed around the mandrels; and FIGURE 35 is an isometric view showing the completed package body after each mandrel of the pair has been withdrawn; and FIGURE 36 is a fragmentary isometric view showing the cam for reopening the nipper members; and FIGURE 37 is a fragmentary view, partially in cross section, taken on the line 37—37 of FIGURE 7; and FIGURE 38 is a fragmentary isometric view, partially in cross section, showing the end tucking means; and FIGURE 39 is an isometric view of the partially completed package after one end tuck has been made; and FIGURE 40 is a fragmentary isometric view, partially in cross section, showing the stationary tucking and the end folding members; and FIGURE 41 is an isometric view of the partially completed package after both end tucks have been completed; and FIGURE 42 is an isometric view of the partially finished package with both end tucks and one end fold completed; and FIGURE 43 is a fragmentary isometric view showing one completely folded end of the package; and FIGURE 44 is a fragmentary isometric view, partially in cross section, showing one end sealing belt including its heating and cooling elements; and FIGURE 45 is an isometric view of the completed package.

The operation of the machine and the practice of the method of the invention will now be described in practicing the formation of the package disclosed in FIGURE 7 of the copending application of Robert V. Burt, Serial Number 54,563, filed August 31, 1960, now Patent No. 3,073,436 assigned to the same assignee. The machine and method can also be used to form other types and kinds of packages such as, for example, the package shown in FIGURES 12 and 13 of the aforesaid Burt application and the package shown in United States Letters Patent 2,911,774 issued on November 10, 1959 to A. R. Frank et al. Purely for convenience, therefore, the following detailed description will make reference to the formation of a package as described in the aforesaid Burt application. This is not to be taken as a limitation on the scope of the present invention, however.

Reference will hereinafter be made to the accompanying drawings in describing the structure and mode of operation of the machine and method for forming packages. For convenience, certain portions of the machine and method have been broken down into operational sections so that each portion of the machine can be described individually.

Power Input and Drive Section

Referring to FIGURES 1 and 2, the machine is composed of a frame 10 supported by legs 11 and 12. An infeed conveyor frame 13 is attached to the frame 10 at one end and is supported by a leg 14. An end folding and sealing conveyor frame 15 is attached to the frame 10 at one end and is supported by the leg 16. A motive power source 17, such as an electric motor or equivalent, drives the main shaft 18 which is supported by the bearings 19, 20, 21, 22 and 23.

The power transmitted to shaft 18 is taken off, as shown in FIGURE 3, to drive the wrapper and liner feed section shown generally at 24 in FIGURES 1 and 2. A sprocket 25 is attached to the main shaft 18 as shown in FIGURE 3, driving the sprocket 26 by means of the chain 27 which is held in proper tension by the idler 28 mounted on the support 29 which is secured to the frame 10. The sprocket 26 is attached to the input shaft of a conventional right angle drive 30 whose output shaft 31 has the drive sprocket 32 secured thereto (FIGURES 1 and 3).

A similar power take-off arrangement is seen by referring to FIGURE 4 wherein the sprocket 33 attached to the shaft 18 drives a sprocket 34 by means of a chain 35 which is held in proper tension by the idler 36 mounted on the frame 10. The sprocket 34 drives a conventional cone drive reducer 37 which in turn rotates the output sprocket 38 (see also FIGURE 1).

Another power take-off is shown at the left end of the machine as viewed from the drive side in FIGURE 1. It can also be seen in FIGURE 5. In this last arrangement, the conventional cone drive reducer 39 has its input shaft 40 directly connected to the main shaft 18. The output sprocket 41 is rotated by the gear arrangement shown in FIGURE 5.

Infeed Conveyor Section

The infeed conveyor is shown generally at 42 in FIGURES 1 and 2. It is composed of a sprocket 43 mounted for free rotation in the frame 13 and a sprocket 44 mounted for rotation in bearings supported in the frame 10. An endless chain 45 runs over the sprockets 43 and 44 and is fitted with a plurality of spaced supports 46.

The supports 46 are substantially U-shaped and are designed to carry the bars of detergent 47 or other product and feed same to the package forming section of the machine in proper spaced relationship. FIGURE 6 illustrates a top view of this portion of the machine and its relationship to the package forming section. For convenience, the means for driving the infeed conveyor section will be described in the following portion of this specification.

*Mandrel and Mandrel Conveying Section*

A plurality of pairs of mandrels are provided to pick up the bars from the infeed conveyor and to support and convey same through the hereinafter described wrapping section. The mandrels are movable toward and away from each other on a common axis and are, likewise, provided with means for rotation on the common axis while being moved through the wrapping section before and after receiving a liner and wrapper from the wrapper and liner feed section.

As seen in FIGURES 1, 2 and 7, a shaft 48 is supported for rotation by the frame 10. A sprocket 49 is attached to the end of shaft 48 on the drive side of the machine (FIGURE 1). The sprocket 49 is driven by the sprocket 38 through the chain 50 which is held in proper tension by the idler 51.

The shaft 48 has a first pair of mandrel chain sprockets 52 and 53 attached on one side, and a second pair of mandrel chain sprockets 54 and 55 attached on the other side (see also FIGURE 6). Another pair of mandrel chain sprockets 56 and 57 are mounted on a shaft 58 (FIGURES 1 and 6) which is supported for rotation by conventional bearings on the frame 10. A similar pair of mandrel chain sprockets 59 and 60 is mounted on the shaft 58 and disposed at the left end of the machine as viewed in FIGURE 6. Four endless mandrel support chains 61, 62, 63 and 64 are mounted on the sprockets 52–56, 53–57, 54–59 and 55–60.

The stationary ways 65 and 66 run the length of the frame 10 between chain pairs 61–62 and 63–64. The ways 65 and 66 are supported by the overhead cross members 67, 68, 69 and 107a.

The infeed conveyor is chain driven from the shaft 58 by the sprocket 69a (FIGURE 2) attached thereto. The sprocket 69a drives the sprocket 69b by means of the chain 69c. The sprockets 69b and 44 are attached to a common shaft.

The details of the mandrel members indicated generally by the reference numeral 70, are shown in FIGURE 8. Each mandrel member 70 is composed of a mandrel carriage 71 having an integral guide 72 on its upper portion. The guide 72 is notched at 73 to ride on the way 65. This keeps the mandrel member 70 in proper relative relationship while moving through the package forming section of the machine. Similarly, of course, the mandrel member forming the other half of each pair will ride on the way 66 on the other side of the frame. A similar arrangement of ways (not shown) is used on the underside of the machine frame to provide a guide for the return of the mandrel carriages. The chains 61, 62, 63, and 64 are provided with lugs 74 and 75 which are secured to the mandrel carriages 71. Thus the chains 61 and 62 move the mandrel carriages 71 and the way 65 maintains them in proper position with respect to the centerline of the machine.

A pair of supports 76 and 77 running the length of frame 10 and rigidly mounted therein are provided to support each mandrel carriage 71 and cause it to bear against the way 65. A shaft 78 is slidable in the bores 79 and 80 of the carriage 71. A compression spring 81 bearing against the shoulder 82 of the shaft 78 normally forces the shaft 78 to the right as viewed in FIGURE 8. Such movement is restrained, however, by the elements to be hereinafter described.

As shown in FIGURES 8 and 9, a gear 83 is secured to the shaft 78. A roller cam follower 84 is secured to one side of the gear 83 and a roller cam follower 85 is secured to the other side. A plate 86 is attached to the end of the shaft 78 and has a cam follower 87 secured thereto with its axis substantially perpendicular to the shaft 78.

The other end of the shaft 78 has a bracket 88 and the mandrel 89 attached thereto as best seen in FIGURES 8, 10 and 11. The mandrel 89 has an upper extension 90 and a lower extension 91 each of which is hollowed out as at 92 and 93.

The bracket 88 has a nipper member 94 pivoted on a stud at 95. The nipper member 94 has a corrugated surface 96 and an integral actuating arm 97 extends therefrom. The pins 98 and 99 are secured to the bracket 88 and the nipper member 94, respectively. A tension spring 100 is attached to the pins 98 and 99 to act as an overcenter device for the nipper member 94, that is, when the nipper member 94 is held open as illustrated in FIGURE 8 it will tend to remain in that position due to the tension of spring 100 until the pin 99 is moved over the line of centers between the stud 95 and pin 98 which action causes the member 94 to snap shut against the mandrel 89. This latter action is used to clamp a liner and wrapper to the mandrel as will be explained in greater detail hereinafter. As shown in FIGURE 11, the mandrels 89 have a corrugated surface 101 which is engaged by the corrugated surface 96 of the nipper member 94 when closed. The mandrels 89 are also provided with a liner clip 102. A raised portion 103 is provided which compensates for differences in total thickness when the wrapper and liner are overlapped after the package body has been formed around the mandrels. This presents a flat and continuous surface to the heat sealing portion of the machine in order to obtain a good seal. The need for and the shape of the raised portion 103 will depend, of course, on the type of package being formed.

*Wrapper and Liner Feed Section*

The wrapper and liner feed section 24 (as illustrated in FIGURES 1 and 2) is used to feed paperboard liner blanks from a hopper and simultaneously feed outer wrappers from a web, cut them to length and then superpose the liner and wrapper and feed them to the mandrel pairs. FIGURE 12 shows the liner 104 and the wrapper 105 in proper superposed relation as fed to the mandrels. FIGURE 26 shows the same liner and wrapper in position on a pair of mandrels 89 and held in place by the nipper members 94.

FIGURE 13 illustrates the wrapper and liner feed mechanism in cross section as it is mounted on the frame of the machine over the ends of the infeed conveyor and the mandrel conveyor. A pair of frames 106 and 106a (only 106 shown in FIGURE 13; 106a can be seen in FIGURE 23) are mounted on the machine frame 10. The frames 106 and 106a are rigidly held by the angle member 107 and the cross member 107a which in turn is secured to the frame 10. The frames 106 and 106a are properly spaced to support a series of feed rollers.

A hopper 108 supports a plurality of stacked liner members and holds them in place as by the adjustable guides 109 and 110. The liners are fed from the hopper 108 by a feed member 111 which is notched as at 112 to engage the back edge of the forward tabs 104a and 104b (FIGURE 12) of each successive liner 104 on the bottom of the stack and feed it to the feed rolls. The feed member 111 is reciprocated by the connecting rod 113 which is pivoted to the crank member 114, which is rotated, in turn, by the constant speed shaft 115.

The liners are fed to the mandrel pair by means of successive pairs of feed rollers. The first pair of rollers 116, 117 are mounted on shafts 118 and 119, respectively. The next pair of feed rollers 120 and 121 are mounted on shafts 122 and 123, respectively. The feed rollers 124 and 125 are mounted on shafts 126 and 127, respectively. The feed rollers 128 and 129 are mounted on shafts 130 and 131, respectively. The feed rollers 132 and 133 are mounted on shafts 134 and 135.

Interposed between the feed roller pairs are a plurality of guides for feeding the liners from one pair of rollers to the next as at 136, 137, 138, 139, 140, 141, 142 and 143.

The wrapper material W in web form is fed from a spool (not shown) over the free roller 144 and between the measuring rolls 145, 146 and 147 which are mounted on shafts 148, 149 and 150. The web W is cut into wrapper lengths by a revolving knife 151 having a blade 152 which is mounted on shaft 153. Measuring rolls 155 and 156 are secured to shafts 157 and 158, respectively, and the severed wrappers 105 are fed to the rollers 159 and 160 which are mounted on shafts 161 and 162, respectively. As in the case of the rollers for feeding the liners, the wrapper feed rollers have a plurality of guides 163, 164, 165, 166, 167, 168, 169, and 170 interposed therebetween.

The means for driving the rollers, cut-off knife and the reciprocating liner feeder will now be described.

Referring again to FIGURE 1, the sprocket 171 attached to the shaft 115 is driven from the drive sprocket 32 by a chain 173 which is held in proper tension by an idler 174. A second sprocket 175 is also attached to the shaft 115. A commercial differential drive 176 has an input sprocket 177. A sprocket 178 is attached to the shaft 153 (also carrying the revolving knife 151, FIGURE 13) which is supported by the bracket 179. A chain 180 held in proper tension by the idler 181 is driven by the sprocket 175 to rotate the sprockets 177 and 178 at substantially constant speed.

It will be noted that since the sprocket 178 is attached to the shaft 153, the revolving knife 151 shown in FIGURE 13 will likewise be driven at substantially constant speed. Similarly, since the sprocket 171 is driven at substantially constant speed and is attached to the shaft 115, it rotates the crank member 114 (see FIGURE 13) at substantially constant speed.

Referring again to FIGURE 13, the rollers 145–146–147 and 155–156 are measuring rolls, that is, they feed the wrapping material W from a web at a controllable speed to obtain proper spacing when the web W is cut to length by the revolving knife 151. In order to vary the speed of the measuring rolls to compensate for web variables such as stretching, shrinkage and/or feed roll slippage, they are driven by a conventional and commercially available differential drive unit 176 which responds to an electric eye signal focused on the wrapping material web at any convenient place as will be appreciated by those skilled in the art.

The output of the differential drive unit 176 is shown in FIGURES 16 and 23. The gear 181 is attached to the output shaft of the differential drive unit 176. The gear 181 engages a gear 182 which is attached to the shaft 183 which has a gear 184 attached to its other end (see also FIGURE 24). The shaft 183 is free to rotate in the frames 106, 106a and in the plate 185 which, in turn, is fixedly mounted in spaced relationship to the frame 106. The plate 185 is shown in outline in FIGURE 16. The gear 184 engages an idler gear 186 which drives a gear 187 attached to the shaft 148 having the roller 145 secured thereto. The shaft 148 has a gear 188 attached to the end outside the plate 185. The gear 188 engages the gear 189 attached to the shaft 149 which also has the roller 146 attached thereto. The gear 189 engages the gear 190 attached to the shaft 150. A second gear 191 is also attached to the shaft 150 on the other side of plate 185 as seen in FIGURES 16 and 23. The gear 191 drives an idler gear 192. The idler gear 192 drives the gear 193 attached to the shaft 158 which also carries the roller 156. The shaft 158 has a second gear 194 secured thereto outside the plate 185 (as also seen in FIGURE 22) which engages a gear 195 secured to the shaft 157 which carries the roller 155. Thus, with the above drive means, the measuring rolls feeding the wrapper material W in web form to and through the cutter member are rotated at substantially constant speed which can be varied by the differential drive 176 to correct for web feed variable such as stretching, shrinkage, feed roll slippage and the like.

All of the remaining feed rollers are driven at variable speed by means which will now be described. Referring to FIGURES 1 and 14, the shaft 115 which is rotated by the sprocket 171 passes through a differential housing 196. A differential arm 197 is keyed to the shaft 115. A shaft 199 is rotatable in one end of the arm 197. A planet gear composed of the segment 200 is attached to the shaft 199 and a cam arm 201 having a follower 202 is attached to the other end of the shaft 199. As viewed in FIGURE 15, the plate 203 has a cam track 204 which guides the cam follower 202. The planetary segment 200 engages a sun gear 205 mounted for free rotation on the shaft 115. A gear 206 is mounted on a common hub 206a with the sun gear 205, said hub extending through the housing 196 and, as aforesaid, being freely rotatable on the shaft 115. The gears 205 and 206 are thus driven at a differential speed by the planetary segment 200 which is rocked on its shaft 199 as it is rotated by the arm 197 due to the shape of the cam track 204. Since all of the remaining rollers are driven by the gear 206, it will be seen that they will rotate in synchronism at a speed imposed by the differential. The reason for doing so will be more fully explained hereinafter.

The gear 206 engages the gear 207 as shown in FIGURES 17 and 18. The gear 207 is secured to the shaft 123 carrying the roller 121. Gears 208, 209, and 210 are also mounted on shaft 123. The gear 210 drives the gear 211a which is attached to the shaft 122 carrying the roller 120.

The gear 209 engages and drives the gear 211 which is mounted for free rotation on the shaft 115 (see FIGURES 16 and 17). The gear 211 drives gear 212 which is mounted on a stud shaft 213. The gear 212 drives the gear 214 which is attached to the shaft 118 carrying the roller 116. The gear 215 is also attached to the shaft 118 and drives the gear 216 mounted on shaft 119 carrying the roller 117.

Refer again now to FIGURE 16. The gear 208 drives an idler gear 217 rotatably mounted on the plate 185 by the stud shaft 218 (see FIGURE 18). As seen in FIGURES 16 and 19, the gear 219 is driven by the idler gear 217. The gear 219 is attached to the shaft 127 which supports the roller 125 and also has the gear 220 attached thereto. The gear 220 drives the gear 221 which is mounted on shaft 126 carrying the roller 124.

The gear 219 drives the idler gear 222 as shown in FIGURE 16. The idler gear 222 drives the gear 223 mounted on a stud shaft 224 as shown in FIGURE 20. Gear 223 drives the gear 225. Gear 225 is fixedly mounted on the shaft 130 which also carres the roller 128. The gear 226 is also attached to the shaft 130 and engages a gear 227 attached to the shaft 131 carrying the roller 129.

An idler gear 228 is engaged by the gear 226 (see FIGURE 16). The gear 228 drives the gear 229 which is mounted on shaft 134 carrying the roller 132. The gear 229 engages the gear 230 mounted on shaft 135 carrying the roller 133.

The idler gear 222 also drives the idler gear 231 which is adjustable as shown. The idler gear 231 engages the gear 232 which, as seen in FIGURE 21, is mounted on shaft 161 carrying the roller 159. The gear 233 which is also mounted on the shaft 161 engages the gear 234 which is mounted on shaft 162 and carries the roller 160.

Referring once again to FIGURE 13, the variable speed rollers 116–117, 120–121, 124–125, 128–129, 132–133 and 159–160 are thus seen to be rotated in unison by the differentially driven sun gear 205. On the other hand, the measuring rollers 145–146–147 and 155–156 are driven at substantially constant speed with some variable control due to the differential drive 176 reacting to a signal on the wrapper web W as sensed by the electric eye. As already explained, the revolving knife 151 is rotated at constant speed as is the crank member 114. Thus, in operation, the web W of wrapper material is fed in over the free roller 144 and passes between the measuring rolls 145–146–147 to the rotating cut-off knife 151. After being cut from the web, each wrapper is fed through the measuring rolls 155–156. As the wrapper is picked up by the rollers 159–160, it is accelerated due to the differential speed drive from the sun gear 205. The wrapper length is generally greater than the spacing between the roller pairs 155–156 and 159–160. However, an overrunning clutch 234a (see FIGURE 22) is provided on the shaft 158 of the roller 156 to permit the severed wrapper to be drawn away from the measuring rolls at an accelerating speed.

The feed member 111 is reciprocated and pushes a liner 104 to the rollers 116–117 on each stroke. Each liner is then fed through the successive roller pairs until it reaches the rollers 128–129 where the severed wrapper is superposed in proper relation for wrapping a bar of detergent. The superposed wrapper and liner are then fed to the last pair of variable speed rollers 132–133 whence they are fed to a pair of mandrels so that the leading edge of the liner 104 engages the liner clips 102 and the superposed liner 104 and wrapper 105 are clamped on the mandrel pair by nipper members 94.

The variable speed rollers are required to pick up the liner from the reciprocating feed member 111 at essentially matched speed and the wrapper from the measuring rolls 155 and 158 at matched or slightly greater speed, and then to bring the liner and wrapper together at matched speed. They properly time and position the liner and wrapper while in motion. A second and a more important function is that they allow the superposed wrapper and liner to come into place with the mandrel pair at matched speeds and in proper position. This latter feature is of some importance since there is no fixed, positive stop for the liner and wrapper to give them positive positioning prior to the wrapping cycle as is the common practice with other kinds of wrapping machines. By making the aforementioned pickups and transfers of liner and wrapper at essentially matched speeds, the detrimental effects of friction and sudden changes in speed are also eliminated which would otherwise create variations in timing and position.

*Wrapping Section*

Referring now again to FIGURES 6 and 8, the manner in which a bar of detergent is held by a mandrel pair and is then wrapped with a superposed liner and wrapper will now be described. The mandrel carriages 71 carrying the mandrels 89 are attached to the chains 61–62 and 63–64. The mandrels 89 are held apart by the cam followers 87 which engage the cam tracks 235 and 236 on either side of the machine. As the upper flight of the chains move to the right as shown in FIGURE 6, the cam tracks 235 and 236 permit the mandrels 89 to move toward each other due to the force of the spring 81 (see FIGURE 8). A bar of detergent is picked up from the infeed conveyor when the mandrels of the pair have completed their movement toward each other.

The mandrel pair is then rotated 90° by the mechanism best illustrated in FIGURE 25 so that the bar 47 is held as shown in FIGURE 11. A cam 237 having a track 238 is engaged by the roller follower 84 to initiate rotation of the mandrel whereupon the gear 83 engages the rack 239 mounted on the frame 10 to continue rotation as the mandrels move along. A second cam 240 having a track 241 decelerates the rotation of the gear 83 so that in effect it is rotated 90° by the cam 237, the rack 239 and the cam 240. The mandrels then are in the position shown in FIGURES 26 and 11. A superposed liner 104 and wrapper 105 are simultaneously delivered from the rollers 132–133 at matched speed with the mandrel pair. The edge of the liner 104 is held against the mandrel by the clip 102. The nipper members 94 are then snapped closed so that the superposed liner and wrapper are clamped to the mandrel pair between the corrugated surfaces 96 and 101. The nipper members 94 are moved to the closed position when they strike the stationary cam 242 attached to the cross member 107a as seen in FIGURES 27 and 28. A cam 242 is provided on both sides of the machine to close the nippers of each member of the mandrel pair.

The mandrel pair is then rotated 360° while moving through the machine. During this rotation, the bristles of the brush 243 (FIGURES 2, 6, 25) suspended over the mandrels exert a pushing force on the liner and wrapper against the mandrel pair. This action coupled with linear movement and rotation of the mandrel pair forms a snug wrap around the mandrels. While a brush 243 is shown herein as exerting the pushing force, other means can be used for the same purpose, e.g. a free moving or driven foam belt has been successfully used.

Rotation of the mandrel pair is initiated, (see FIGURE 25) by a cam 244 having a track 245 which is engaged by the follower 85 on the gear 83. After rotation has been initiated by the cam 244, the gear 83 engages the rack 246 to rotate the mandrels as they move along under the brush 243 or its equivalent. The manner in which the liner and wrapper are formed around the mandrels by the brush 243 or equivalent is shown in 90° sequences in FIGURES 29, 30, 31 and 32.

When the liner and wrapper have been completely wrapped around the mandrels, rotation is stopped as the follower 84 engages the track 247 in the cam 248 which is attached to the frame 10 of the machine.

*Side Sealing and Mandrel Withdrawal Section*

After the liner and wrapper have been formed around the mandrels, the overlapped portions of the wrapper are then heat sealed (it is assumed here that a heat sealable material is used for the wrapper which is common practice in the packaging art). A heat conductive sealing belt 249 (FIGURES 1 and 2) is provided for this purpose with its lower flight moving in the same direction and at the same speed as the mandrels. The lower flight is also in contact with the overlapped portions of the outer wrapper.

As seen in FIGURE 1, the sealing belt 249 is driven from the shaft 48 by means of the sprocket 250 attached thereto. The sprocket 250 drives the sprocket 251 in opposite rotation through the chain 252 and the idlers 253 and 254. The sprocket 251 is secured to a shaft 255, see FIGURE 33, and drives a pulley 256 which supports one end of the sealing belt 249.

The other end of the sealing belt 249 is supported by the idler pulley 257 suspended from the cross member 67 and the belt tension is maintained by a pulley 258 resting on its upper flight which is rotated in a pivoted arm 259 secured to the frame of the machine. A heater element 260 is in contact with the lower flight of the sealing belt 249 and conducts sufficient heat through the belt to heat seal the overlapped portions of the wrapper while it is being moved along by the mandrel pair with the follower 84 in the straight portion of the cam 248 (see FIGURE 25). A cooling element 261 is in contact with the sealing belt 249 and chills the previously made heat seal so that it has hardened sufficiently to withstand further wrapping operations.

After passing beyond the side sealing section, the mandrels are rotated 90° to prepare the partially formed package for delivery to the next section of the machine. Referring to FIGURE 25, this is accomplished by the followers 84 initiating rotation of the mandrels as they move through the end of the track 247 to initiate rotation of the gear 83 prior to its engagement with the rack 262 which is attached to the machine frame. The rack 262 then rotates the mandrels until the follower 85 engages the track 263 of the cam 264 returning the mandrels to their initial position prior to any rotation as will be appreciated by viewing FIGURE 25. The partially completed package is then in the position and condition shown in FIGURE 34. Further linear movement of the mandrel pair delivers the partially completed package to the upper and lower conveying belts 265 and 266 (see FIGURE 2) which conveys the package through the remainder of the folding and sealing steps. These belts have a deformable surface, e.g. a spongy material, to maintain the partially finished package in square alignment while the mandrels are withdrawn and as the belts carry forward the partially completed package against the forces which act on the package to complete the folding steps.

The mandrels are then withdrawn from the partially completed package as the followers 87 enter the cam tracks 267 and 268 (FIGURE 6) until the relative position of the mandrels with respect to the partially completed package achieves the position shown in FIGURE 35. The mandrels are then returned on the lower flight of the chains 61–62 and 63–64. While being returned, they engage a cam 269 (see FIGURE 36) which bears against the actuating arms 97 of the nipper members 94 to open the nipper members and return them to the position shown in FIGURE 8. The mandrels are then in condition for beginning the cycle again when they are conveyed to the upper flight of the chains supporting them.

*End Tucking, Folding and Sealing Section*

The upper conveyor belt 265 and lower conveyor belt 266 which carry the partially finished packages after the mandrels have been withdrawn are driven by the pulleys 273 and 274 shown in FIGURES 1 and 2. The drive for the pulleys as well as for the end sealing belts 275 and 276 (shown in FIGURE 6) may best be understood by referring to FIGURES 1 and 5. The output sprocket 41 from the cone gear reducer drive 39 drives a sprocket 277 on the shaft 278 by means of the chain 279. The pulley 274 is secured to the shaft 278 and drives the lower conveyor belt 266. Right angle drives 280 and 281 are driven by the shaft 278.

The output shaft 282 from the right angle drive 280 rotates the drive pulley 283 for the sealing belt 275. The other end of the sealing belt 275 turns over the idler pulley 284 which is mounted on the support 15. A tensioning pulley 285 rotates freely in the arms 286 which are pivoted to the support 15 to maintain proper tension on the sealing belt 275.

The output shaft 287 from the right angle drive 281 drives a pulley 288 for the sealing belt 276 and a right angle drive 289. The output shaft 290 from the right angle drive 289 rotates the pulley 271 which drives the upper conveyor belt 265. The sealing belt 276 has an idler pulley 292 and a tensioning pulley 293 rotated in arms 294 which maintains the sealing belt 276 in proper tension.

Referring now to FIGURES 1, 7 and 37, the drive for the rotating tucker members 295 and 296 will now be described. The shaft 48 carries a sprocket 297 which drives a sprocket 298 on the shaft 299 by means of the chain 300. An idler 301 is provided to keep the chain 300 in proper tension. As seen in FIGURE 7, the shaft 299 drives two right angle gear boxes 302 and 303 whose output shafts drive, respectively, the rotating tucker members 295 and 296.

Referring now to FIGURES 1, 2 and 38, the partially finished packages are conveyed along by the conveyor belts 265 and 266 which are kept in proper spaced relation between backing members 304 and 305. As the partially completed package 306 in FIGURE 38 passes the rotating tucker members 295 and 296, the first end tuck is made to complete the package to the point shown in FIGURE 39. (The rotating tucker members 295 and 296 rotate as indicated in FIGURE 6.) As the package continues to be moved by the belts 265 and 266, it next passes a stationary tucking member 307 as shown in FIGURES 2 and 40. The package is then completed to the extent shown in FIGURE 41. The ends 308 and 309 (FIGURE 41) on both sides of the package are then successively engaged by the plows 310 and 311 to complete the end folding steps first to the point shown in FIGURE 42 and then fully complete as shown in FIGURE 43.

As the package with folded ends continues to be moved by the belts 265 and 266, their ends come between the sealing belts 275 and 276 as seen in FIGURES 6 and 44. Heater elements 312 and 313 disposed on the inside of the end sealing belts transmit heat through the belts to form the end seals on the package. The cooling elements 314 and 315 then chill these seals so they will not open when the finished package issues from the wrapping machine. The completed package as shown in FIGURE 45 is delivered to a conventional take away conveyor where it can be sent to a conventional case packing machine to be packaged and shipped for use by a consumer.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. A wrapping machine comprising an inlet conveyor for transferring articles in spaced relationship to the wrapping machine, a plurality of pairs of spaced mandrels mounted to move in a circuitous path in said wrapping machine at a substantially constant speed, means for moving each pair of mandrels inwardly to engage and carry successive articles fed to the wrapping machine by said inlet conveyor, means for feeding a wrapper to said mandrels, means for holding said wrapper on said mandrels, means for folding the wrapper around the inner end portions of the mandrels, means for withdrawing said mandrels from said wrapper, a second conveyor mounted beyond said withdrawing means including means for receiving and conveying the partially wrapped article, means for transferring the partially wrapped article to said second conveyor and means for forming the end tucks and folds on said wrapper to complete the package as it is being transported by said second conveyor.

2. A wrapping machine comprising means for continuously feeding successive articles in uniform spaced relationship, a plurality of pairs of mandrels mounted for movement in a substantially circuitous path in said wrapping machine and at a substantially constant speed, means for moving each member of each pair of mandrels toward the other member of the pair thereby to engage and support each sucessive article fed to the machine, means for feeding a wrapper to each mandrel pair, means for folding the wrapper around the mandrel pair, means for withdrawing the mandrel pair from the partially completed package and means for thereafter tucking, folding and sealing the end portions of the wrapper to complete the package.

3. A wrapping machine comprising a plurality of pairs of mandrels with each mandrel of each pair mounted in axial alignment, means for continuously moving said mandrels in a circuitous path on said wrapping machine at a substantially constant speed, means for moving each mandrel of each pair axially toward the other member of the pair thereby to engage and support each successive article fed to the wrapping machine, means for holding a wrapper on each mandrel pair, means for folding the wrapper around each mandrel pair, means for withdrawing the mandrel pair from the partially completed package and means for thereafter tucking, folding and sealing the end portions of the wrapper to complete the package.

4. A wrapping machine comprising means for continuously feeding sucessive articles in uniform spaced relationship, a plurality of pairs of spaced mandrels mounted to move in a circuitous path in said wrapping machine at a substantially constant speed, means for moving each mandrel of each pair axially toward the other member of the pair thereby to engage and support each successive article fed to the wrapping machine, means for feeding a wrapper to each mandrel pair, means for folding the wrapper around the mandrel pair, means for withdrawing the mandrel pair from the partially completed package and means for thereafter tucking, folding and sealing the end portions of the wrapper to complete the package.

5. A wrapping machine comprising means for continuously feeding successive articles in uniform spaced relationship, a plurality of pairs of mandrels mounted for movement in a substantially circuitous path in said wrapping machine and at a substantially constant speed, means for moving each member of each pair of mandrels toward the other member of the pair thereby to engage and support each successive article fed to the machine, means for feeding a wrapper to each mandrel pair, means for pushing the wrapper against the mandrel pair, means for turning each mandrel pair in unison whereby the said pushing means forms the wrapper around the mandrel pair, means for withdrawing the mandrel pair from the partially completed package and means for thereafter tucking, folding and sealing the end portions of the wrapper to complete the package.

6. A wrapping machine comprising a plurality of pairs of mandrels with each pair mounted in axial alignment, means for continuously moving said mandrels in a circuitous path on said wrapping machine at a substantially constant speed, means for moving each mandrel of each pair axially toward the other member of the pair thereby to engage and support each successive article fed to the wrapping machine, means for holding a wrapper on each mandrel pair, means for pushing the wrapper against the mandrel pair, means for turning each mandrel pair in unison for at least one revolution so that the said pushing means forms the wrapper around the mandrel pair, means for withdrawing the mandrel pair from the partially completed package and means for thereafter tucking, folding and sealing the end portions of the wrapper to complete the package.

7. A wrapping machine comprising means for feeding successive articles in uniform spaced relationship, a plurality of pairs of spaced mandrels mounted to move in a circuitous path in said wrapping machine at a substantially constant speed, means for moving each mandrel of each pair axially toward the other member of the pair thereby to engage and support each successive article fed to the wrapping machine, means for feeding a wrapper to each mandrel pair, means for pushing the wrapper against the mandrel pair, means for turning each mandrel pair in unison for at least one revolution so that the said pushing means forms the wrapper around the mandrel pair, means for sealing the overlapped portions of the ends of the wrapper, means for thereafter withdrawing the mandrel pair from the partially completed package and means for thereafter tucking, folding and sealing the end portions of the wrapper to complete the package.

8. A wrapping machine comprising a plurality of pairs of mandrels with each pair mounted in axial alignment, means for moving said mandrels in a circuitous path on said wrapping machine at a substantially constant speed, means for moving each mandrel of each pair axially toward the other member of the pair thereby to engage and support each successive article fed to the wrapping machine, a nipper member pivoted to engage each of said mandrels, means to actuate said nipper members so that they engage and hold a wrapper on said mandrel members, means for pushing the wrapper against the mandrel pair, means for rotating said mandrel pair mounted at the outer ends thereof, said means turning each mandrel pair in unison for at least one revolution so that the said pushing means forms the wrapper around the mandrel pair, means for sealing the overlapped portions of the ends of the wrapper, means for thereafter withdrawing the mandrel pair from the partially completed package and means for thereafter tucking, folding and sealing the end portions of the wrapper to complete the package.

9. A wrapping machine comprising means for storing a plurality of paperboard liners, a plurality of feed rolls for feeding a web of outer wrapper material, cut-off means for cutting the web into proper lengths for each package, means for synchronizing and feeding a liner and an outer wrapper so that they are in proper superposed relationship, a plurality of pairs of mandrels with each pair mounted in axial alignment, means for moving said mandrels in a circuitous path on said wrapping machine at a substantially constant speed, means for moving each mandrel of each pair axially toward the other member of the pair thereby to engage and support each successive article fed to the wrapping machine, means for receiving the superposed liner and outer wrapper and holding same on each mandrel pair, means for folding the wrapper around each mandrel pair, means for withdrawing the mandrel pair from the partially completed package and means for thereafter tucking, folding and sealing the end portions of the wrapper to complete the package.

10. A wrapping machine comprising means for storing a plurality of paperboard liners, a plurality of feed rolls for feeding outer wrappers, means for synchronizing and feeding an outer wrapper and a liner in superposed relationship, an infeed conveyor for feeding articles in uniform spaced relationship, a plurality of pairs of spaced mandrels mounted to move in a circuitous path in said wrapping machine at a substantially constant speed, means for moving each mandrel of each pair axially toward the other member of the pair thereby to engage and support each successive article fed to the wrapping machine by said infeed conveyor, means for receiving the superposed liner and outer wrapper and holding same on each mandrel pair, means for folding the liner and outer wrapper around each mandrel pair, means for sealing the overlapped portions of the ends of the outer wrapper, means for thereafter withdrawing the mandrel pair from the partially completed package and means for thereafter tucking, folding and sealing the end portions of the wrapper to complete the package.

11. A wrapping machine comprising means for storing a plurality of paperboard liners, a plurality of feed rolls for feeding a succession of outer wrappers, means for synchronizing and feeding an outer wrapper and a liner in superposed relationship, means for feeding successive articles in uniform spaced relationship, a plurality of pairs of mandrels mounted for movement in a substantially circuitous path in said wrapping machine and at substantially constant speed, means for moving each member of each pair of mandrels toward each other thereby to engage and support each successive article fed to the machine, means for feeding the said superposed liner and outer wrapper to each mandrel pair, means for pushing the liner and outer wrapper against the mandrel pair, means at the outer end of each of said mandrels to rotate same said last mentioned means being actuated to turn each mandrel pair in unison whereby the said pushing means forms the wrapper around the mandrel pair, means for withdrawing the mandrel pair from the partially completed package and means for thereafter tucking, folding and sealing the end portions of the wrapper to complete the package.

12. A wrapping machine comprising a hopper for storing a plurality of paperboard liners, a plurality of feed rolls for feeding a succession of outer wrappers, means for synchronizing and feeding an outer wrapper and a liner in superposed relationship, a plurality of pairs of mandrels with each member of each pair mounted in axial alignment, means for moving said mandrels in a circuitous path on said wrapping machine at a substantially constant speed, means for moving each mandrel of each pair axially toward the other member of the pair thereby to engage and support each successive article fed to the wrapping machine, means for pushing the superposed outer wrapper and liner on each mandrel pair, a gear mounted at the outer end of each said mandrels, said gears engaging a rack on said wrapping machine thereby turning each mandrel pair in unison for at least one revolution so that the said pushing means forms the wrapper around the mandrel pair, means for withdrawing the mandrel pair from the partially completed package and means for thereafter tucking, folding and sealing the end portions of the wrapper to complete the package.

13. A wrapping machine comprising a hopper for storing a plurality of paperboard liners, a plurality of feed rolls for feeding a web of outer wrapper material, cut-off means for cutting the web into proper lengths for each package, means for synchronizing and feeding a liner and an outer wrapper so that they are in proper superposed relationship, means for feeding successive articles in uniform spaced relationship, a plurality of pairs of spaced mandrels mounted to move in a circuitous path in said wrapping machine at a substantially constant speed, means for moving each mandrel of each pair axially toward the other member of the pair thereby to engage and support each successive article fed to the wrapping machine, means for feeding said superposed liner and wrapper to each mandrel pair and to hold same thereon, means for pushing the liner and wrapper against the mandrel pair, a gear mounted at the outer end of each of said mandrels, each of said gears being moved with the mandrels and engaging a rack on the wrapping machine for a comparatively short distance of travel thereby turning each mandrel pair in unison for at least one revolution so that the said pushing means forms the wrapper around the mandrel pair, means for sealing the overlapped portions of the ends of the wrapper, means for thereafter withdrawing the mandrel pair from the partially completed package and means for thereafter tucking, folding and sealing the end portions of the wrapper to complete the package.

14. A wrapping machine comprising a hopper for storing a plurality of paperboard liners, a plurality of feed rolls for feeding a web of outer wrapper material, cut-off means for cutting the web into proper lengths for each package, means for synchronizing and feeding a linear and a wrapper so that they are in proper superposed relationship, a plurality of pairs of mandrels with each pair mounted in axial alignment, means for moving said mandrels in a circuitous path on said wrapping machine at a substantially constant speed, means for moving each mandrel of each pair axially toward the other member of the pair thereby to engage and support each successive article fed to the wrapping machine, a nipper member pivoted on each of said mandrels, means to actuate said nipper members so that they engage and hold the superposed liner and wrapper on said mandrel members, means including a foam belt for engaging and pushing the liner and wrapper against the mandrel pair, a gear mounted at the outer end of each of said mandrels, said gears engaging a rack on said wrapping machine thereby turning each mandrel pair in unison for at least one revolution so that the said foam belt forms the wrapper around the mandrel pair, means for sealing the overlapped portions of the ends of the wrapper, means for thereafter withdrawing the mandrel pair from the partially completed package and means for thereafter tucking, folding and sealing the end portions of the wrapper to complete the package.

15. In a machine for wrapping an article to form a packaged article, means for continuously feeding wrappers, a pair of axially aligned mandrels, each of said mandrels having hollowed out upper and lower extensions for receiving and supporting the article to be packaged, means for receiving and retaining a wrapper on said mandrel pair, means for exerting a relatively light force against the wrapper causing it to bear on the faces of the mandrel pair and means for rotating the mandrel pair to form the wrapper around the mandrels due to the said force exerting means.

16. In a machine for wrapping an article to form a packaged article, means for continuously feeding wrappers, a plurality of pairs of mandrels, each of said mandrels having hollowed out upper and lower extensions to receive and support the article being packaged, means for moving each mandrel of each pair toward the other member of the pair to engage and support the said article, means for receiving the wrapper on said mandrel pair, means for pushing the wrapper against the mandrel pair and means for rotating the mandrel pair to form the wrapper around the mandrel due to the cooperating action by said pushing means.

17. In a machine for wrapping an article to form a packaged article, means for continuously feeding wrappers, a pair of axially aligned mandrels having hollowed out upper and lower extensions for receiving and supporting the article, means for continuously moving the mandrel pair in a path of travel transverse to their axis of alignment, means for receiving and retaining the wrapper on said mandrel pair, means for pushing the wrapper against the mandrel pair, means at the outer end of each mandrel to rotate said mandrels for a portion of their path of travel, said rotational action causing the wrapper to be formed around the mandrel due to the cooperating action of the pushing means.

18. In a machine for wrapping an article to form a packaged article, a plurality of spaced apart pairs of mandrel carriages mounted for movement in a circuitous path, each member of each pair being independently supported and moved in unison with the other member of said pair, each member of said pair having substantially coaxial bores, a mandrel having a shaft extension for axial sliding motion in each of said bores of said mandrel carriages, each mandrel having a cross section substantially the same as the inner cross section of the package to be formed and being shaped to receive and support the article being packaged, the outer end of the shaft extension of each mandrel of each pair having a gear mounted thereon, a nipper member pivoted to engage each of said mandrels, means for continuously moving said mandrel pairs in a path of travel, means for continuously feeding wrappers to each pair of mandrels as they move past a wrapper feed station, means for actuating said nipper members so that they rotate shut and bear against the wrapper to hold the wrapper against the mandrel pair, means for exerting a pressure against the mandrels as they are moved, a stationary rack engaging each of the gears of each mandrel to rotate the mandrels in unison through at least 360° whereby the wrapper is formed around the mandrel by its combined linear and rotational movement as it passes under said pressure exerting means.

19. The device claimed in claim 18 including a cam follower on each of said gears cooperating with a stationary cam mounted on the machine for accelerating and deaccelerating the rotational movement imparted to the mandrels by said gears.

20. In a machine for wrapping an article to form a packaged article, at least one pair of mandrel carriages, means for moving said carriages continuously in a circuitous path of travel substantially in unison, each member of said pair having a bore substantially coaxially with a bore in the other member of said pair, a mandrel member with a shaft extension mounted in each of said bores, said shaft extension mounted for sliding movement in said carriages, the end nearest the other member of said mandrel pair having a cross section substantially the same as the inner cross section of the package being formed, the said end being shaped to receive and support the article being packaged, the other end of each mandrel pair being provided with means for selectively rotating said mandrels in unison, a wrapper feed station for continuously feeding wrappers to said mandrel pair, means for holding said wrapper to said mandrel pair, means for pushing the wrapper against the mandrel pair as they move while simultaneously rotating the mandrel pair to wrap and form the wrapper around the mandrel pair.

21. The device claimed in claim 20 wherein the means for intermittently rotating the mandrels comprises a gear member secured to the shaft extension and a cooperating rack secured to the frame of the machine whereby the gear member engages the rack for a portion of its path of travel to rotate the mandrel pair in unison.

22. The device claimed in claim 20 wherein the means for holding the wrapper to the mandrel pair comprises a nipper member pivotally attached near the inner end of each mandrel of said pair, means for normally biasing the nipper members open and means for snapping shut the nipper members to engage and hold the wrapper on the mandrel pair as the latter moves past the wrapper feed station to pick up a wrapper.

23. In a machine for wrapping an article to form a packaged article, a wrapper and liner feed section comprising a liner hopper, a reciprocating feeding member for moving the bottom liner in the hopper to a first pair of variable speed rolls at matched speed with the roller, means for feeding a wrapper from a pair of measuring rollers to a second pair of variable speed rollers driven in synchronism with said first pair whereby the liner and wrapper are brought together at matched speed.

24. The device claimed in claim 23 including means for severing the wrapper from the web fed to the measuring rollers.

25. In a machine for wrapping an article to form a packaged article, a wrapper and liner feed section comprising a plurality of pairs of measuring rolls and a plurality of pairs of variable speed rolls, a hopper for retaining a plurality of liners, a reciprocating member for feeding the lowermost liner from the hopper and at matched speed to a pair of the variable speed rolls, means for feeding outer wrappers from the measuring rollers at substantially matched speed to another pair of variable speed rollers, said pairs of variable speed rollers being so spaced as to feed the liner and outer wrapper in proper superposed relation and at proper speed to the wrapping section of the machine.

26. The device claimed in claim 25 including cut-off means interposed between a pair of measuring rolls to sever a continuous web of outer wrapper material into individual wrappers.

27. The device claimed in claim 25 including a differential drive means for driving the variable speed rollers.

28. A method of forming a package comprising the steps of supporting an article between the ends of a pair of package shaping members, superposing a package liner and an outer wrapper and then folding the superposed liner and outer wrapper around the package forming members so that the ends of the outer wrapper are overlapped, sealing said overlapped portions, withdrawing the package shaping members from the partially formed package, thereafter tucking, folding and sealing the edge portions of the wrapper to complete the package around the article.

References Cited in the file of this patent

UNITED STATES PATENTS

| | | |
|---|---|---|
| 579,038 | Bunol | Mar. 16, 1897 |
| 965,317 | Nyberg | July 26, 1910 |